United States Patent
Bang

(10) Patent No.: US 7,277,277 B2
(45) Date of Patent: Oct. 2, 2007

(54) COMPUTER WITH A DETACHABLE MAIN CASING COVER AND A METHOD OF ASSEMBLING SAME

(75) Inventor: Seog Bang, Yongin-si (KR)

(73) Assignee: Samsung Electronics Co., Ltd, Suwon-Si (KR)

(*) Notice: Subject to any disclaimer, the term of this patent is extended or adjusted under 35 U.S.C. 154(b) by 120 days.

(21) Appl. No.: 11/142,405

(22) Filed: Jun. 2, 2005

(65) Prior Publication Data

US 2005/0286217 A1  Dec. 29, 2005

(30) Foreign Application Priority Data

Jun. 28, 2004  (KR) ............... 10-2004-0048725

(51) Int. Cl.
*G06F 1/16* (2006.01)
(52) U.S. Cl. .............. 361/683; 361/727; 312/223.1
(58) Field of Classification Search ............ 361/610, 361/679, 683, 727, 747, 752, 755, 801; 312/223.1, 312/223.2
See application file for complete search history.

(56) References Cited

U.S. PATENT DOCUMENTS 4,909,579 A * 3/1990 Liu ............ 312/223.2
5,666,273 A * 9/1997 Kurcbart ............ 361/814
5,743,606 A * 4/1998 Scholder ............ 312/223.2
5,995,363 A   11/1999 Wu
6,349,825 B1  2/2002 Swinger et al.
6,469,904 B1  10/2002 Vigeant et al.
2003/0147224 A1* 8/2003 Chen ............ 361/752

FOREIGN PATENT DOCUMENTS

| KR | 0124409 | 3/1997 |
|---|---|---|
| KR | 1999-0070457 | 9/1999 |
| KR | 2004-0005504 | 1/2004 |
| KR | 2004-0005506 | 1/2004 |

* cited by examiner

*Primary Examiner*—Jayprakash Gandhi
*Assistant Examiner*—Anthony Q Edwards
(74) *Attorney, Agent, or Firm*—Roylance, Abrams, Berdo & Goodman, LLP

(57) ABSTRACT

A computer with a detachable main casing cover and a method of assembling the same comprises a main casing formed with an opening through which a plurality of hardware components are accommodated therein. The cover is connected to the main casing and is configured to open and close the opening. A hinge is provided between the main casing and the cover. The hinge connects the cover with the main casing to allow the cover to rotatably open and close the opening of the main casing. Additionally, an engaging portion is provided in an engaging region between the main casing and the cover and prevents the cover from rotating relative to the main casing.

16 Claims, 7 Drawing Sheets

COMPUTER WITH A DETACHABLE MAIN CASING COVER AND A METHOD OF ASSEMBLING SAME

CROSS-REFERENCE TO RELATED APPLICATIONS

This application claims the benefit under 35 U.S.C. § 119(a) of Korean Patent Application No. 2004-0048725, entitled "Computer," filed on Jun. 28, 2004, the entire disclosure of which is hereby incorporated by reference.

BACKGROUND OF THE INVENTION

1. Field of the Invention

The present invention relates to an improved computer having a detachable main casing. More particularly, to a computer in which the cover of the main casing is conveniently opened by depressing a push button, thereby allowing a user to easily replace and repair hardware components accommodated in the main casing.

2. Description of the Related Art

Generally, there are frequent occasions when a user replaces or repairs hardware components disposed within a computer.

To facilitate the replacement or the repair of the hardware components disposed in the computer, computers have recently been manufactured to include a main casing and a cover detachable from the main casing. For example, the computer, disclosed in Korean Patent Application No. 2001-0068914, comprises a front cover provided with a power switch to turn on/off the computer, a main casing formed with an opening on a predetermined side for accommodating a plurality of hardware components therein, and a cover detachably coupled to the main casing covering the opening of the main casing.

With this configuration, the cover is detachable from the main casing, thereby facilitating the replacement and the repair of the hardware components accommodated in the computer.

However, in such conventional computers, because the cover is detachably coupled to the main casing by afastener, a tool is additionally needed to separate the cover from the main casing.

Furthermore, because the cover and the main casing have completely separate structures from each other, it is difficult to correctly align the cover with the main casing when the cover and the main casing are assembled.

Therefore, a need exists for a computer having a main casing with an improved detachable cover for allowing a user to easily replace and repair hardware components accommodated in the main casing.

SUMMARY OF THE INVENTION

Accordingly, embodiments of the present invention and a method of assembling thereof have been conceived to solve the above-mentioned problems occurring in the prior art, and an aspect of the present invention is to provide a computer in which a cover is not completely separated from a main casing and is opened and closed in a simple and easy manner.

The foregoing and other objects are substantially realized by providing a computer comprising a main casing formed with an opening through which a plurality of hardware components are accommodated therein; a cover connected to the main casing, and opening and closing the opening; a hinge provided between the main casing and the cover and connecting the cover with the main casing to allow the cover to rotatably opening and closing the opening of the main casing; and an engaging portion provided in an engaging region between the main casing and the cover and preventing the cover from rotating relative to the main casing, the hinge being slidable to allow the cover to get out of the engaging portion and rotate relative to the main casing.

The hinge comprises a hinge shaft provided in one of the main casing and the cover, and a slotted hole provided in the other one thereof and accommodating the hinge shaft therein to allow the cover to slide with respect to the hinge shaft.

The computer further comprises a locking unit provided between the main casing and the cover and allowing the cover to be elastically locked to or released from the main casing.

The locking unit comprises a locking portion formed in one of the main casing and the cover, and a latch provided in the other one thereof and being elastically locked to or released from the locking portion.

The locking unit comprises a button contacting the latch to operate the latch.

The button and the latch are provided in the cover, and the locking unit is formed on the main casing in correspondence to the latch.

The main casing is provided with a stopper to restrict a movable range of the latch when the latch is released from the locking unit.

The latch comprises a hook portion being released from or locked to the locking portion according to whether the button is pushed or not, and an extended portion extending from the hook portion and coupled to the main casing.

The main casing comprises a front cover forming an outer appearance in a front thereof, and the engaging portion comprises a skirt portion and a bending portion formed at a free end of the cover to be engaged with an inside of the skirt portion.

The elongated hole is long enough to allow the bending portion to extend through the skirt portion. The foregoing and other objects are also substantially realized by providing method of assembling a computer having a main casing formed with an opening by connecting a cover to the main casing for opening and closing the opening. Then, arranging a hinge between the main casing and the cover for connecting the cover with the main casing, and for allowing the cover to rotatably open and close the opening of the main casing. Providing an engaging portion in an engaging region between the main casing and the cover, the engaging portion preventing the cover from rotating relative to the main casing. Lastly, slidably positioning the hinge to allow the cover to disengage from the engaging portion and rotate relative to the main casing.

Other objects, advantages, and salient features of the invention will become apparent from the detailed description, which, taken in conjunction with the annexed drawings, disclose preferred embodiments of the invention.

BRIEF DESCRIPTION OF THE DRAWINGS

The above and other aspects, features, and advantages of certain embodiments of the present invention will become apparent from the following detailed description taken with reference to the accompanying drawings, in which.

Throughout the drawings, the same drawings reference numerals will be understood to refer to the same elements, features, and structures.

DETAILED DESCRIPTION OF EXEMPLARY EMBODIMENTS

The matters defined in the description such as a detailed construction and elements thereof, are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions are omitted for conciseness.

Figure 1:
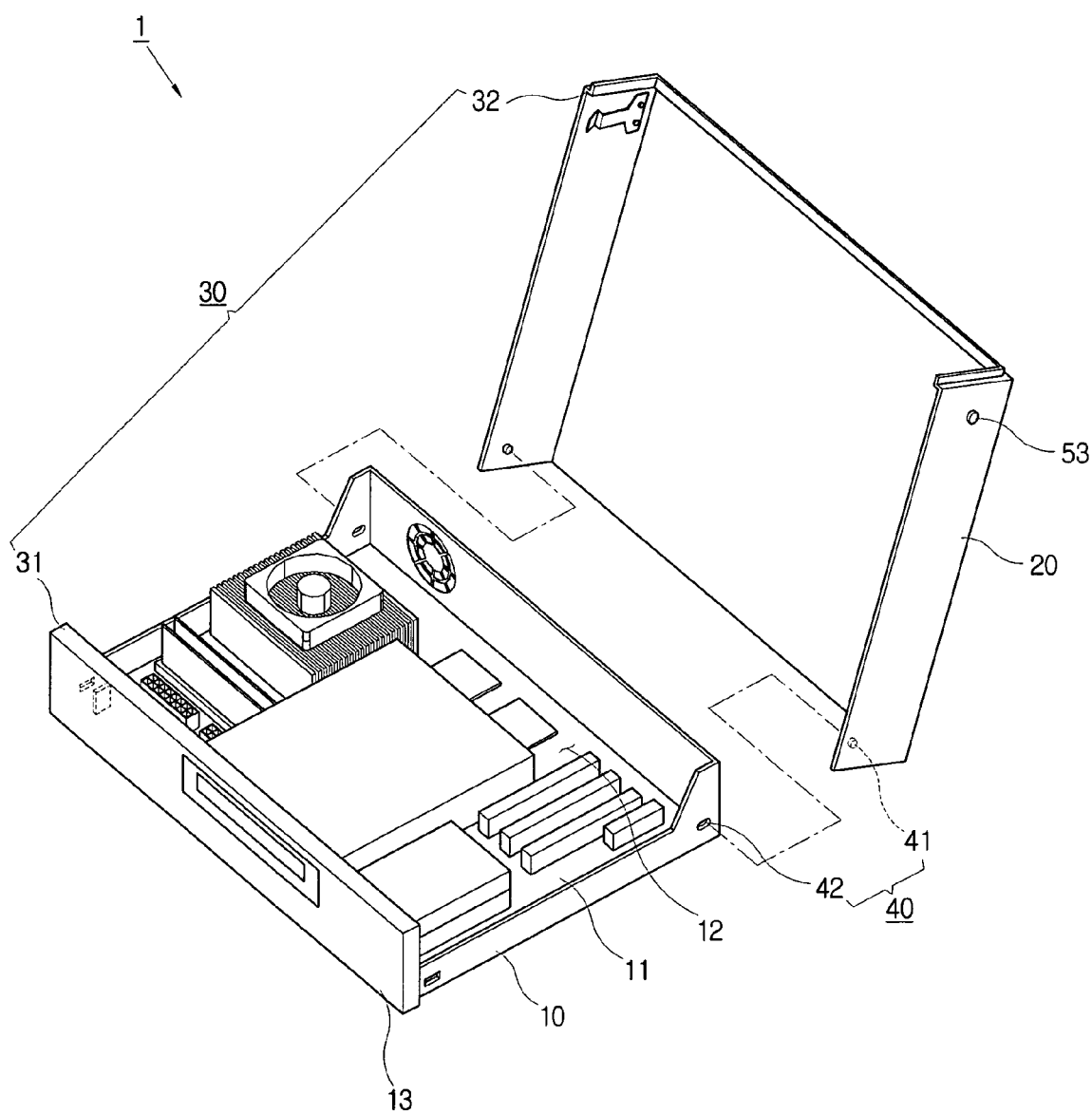
FIG. 1 is a disassembled perspective view of a main casing and a cover in a computer in accordance with an embodiment of the present invention.
Figure 2:
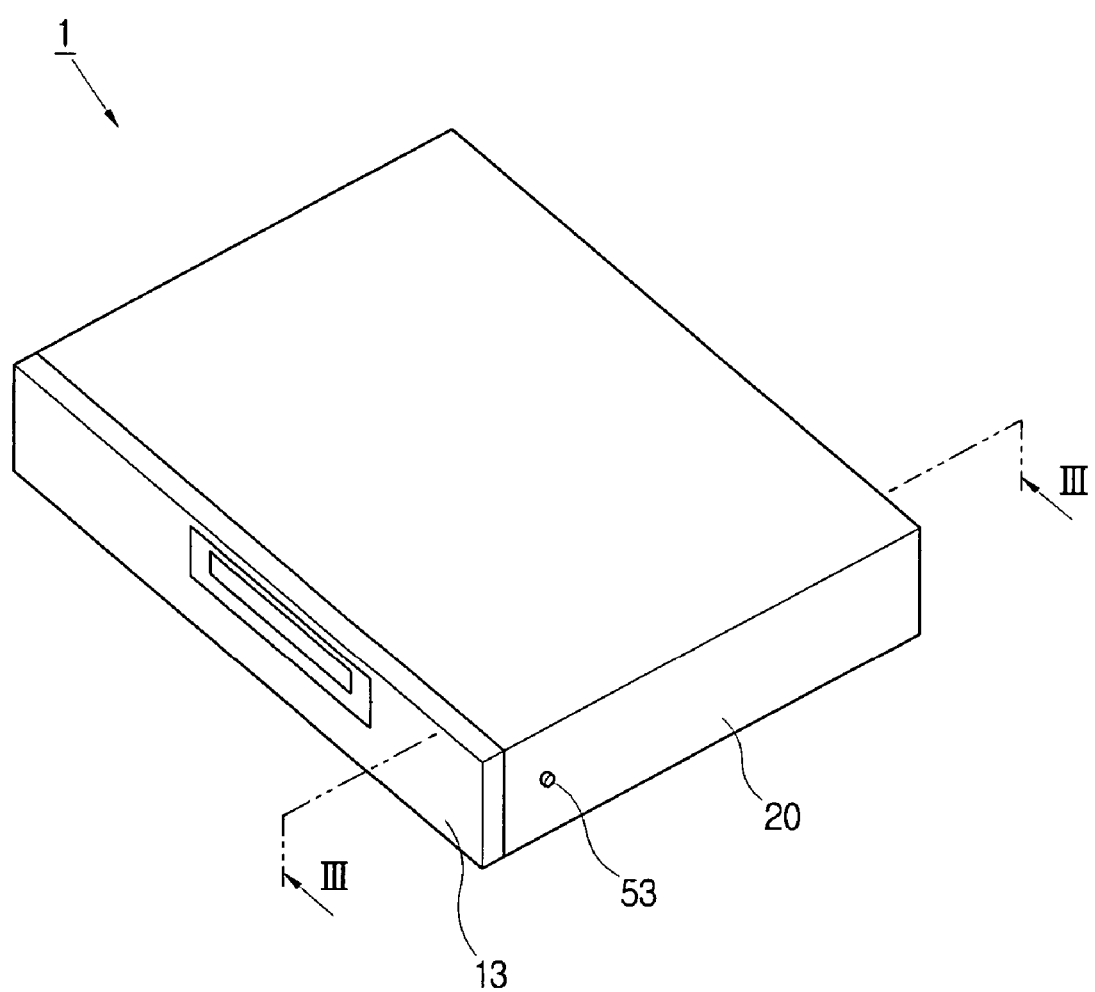
FIG. 2 is an assembled perspective view of the main casing and the cover of the computer of FIG. 1.

As shown in FIGS. 1 and 2, a computer 1 according to an embodiment of the present invention comprises a main casing 10 formed with an opening 12 at a side thereof to accommodate a plurality of hardware components. A cover 20 is connected to the main casing 10 for opening/closing the opening 12, and a hinge 40 is provided between the main casing 10 and the cover 20 for connecting the cover 20 with the main casing 10. Thus, allowing the cover 20 to be rotatably opened and closed relative to the opening of the main casing 10.

A main board 11 is inserted through the opening 12 of the main casing 10. Additionally, the main board 11 is mounted with a central processing unit (CPU), a random access memory (RAM), and the like. Further, the main casing 10 comprises a front cover 13 forming an outer surface in a front thereof, and a skirt portion 31 bent backward from a top portion of the front cover 13.

Figure 3:
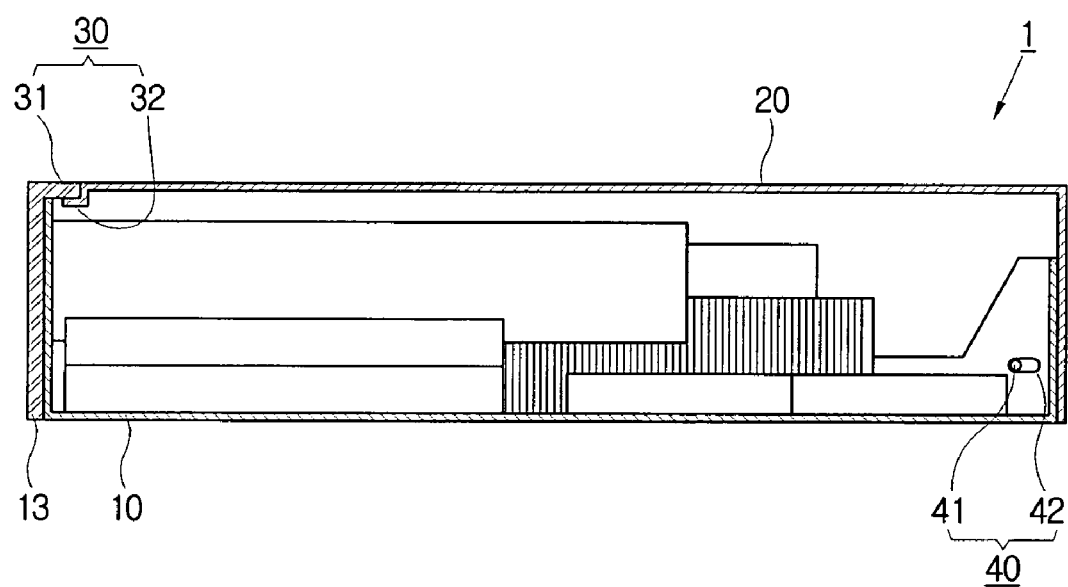
FIG. 3 is a sectional view of the computer, taken along line III-III in FIG. 2.

As shown in FIG. 3, the cover 20 is rotatable about the main casing 10 with respect to the hinge 40 which is provided in a back region of the main casing 10. Further, the cover 20 is formed with a bending portion 32 at a free end thereof for engaging with the skirt portion 31 of the front cover 13. Hereinafter, the bending portion 32 of the cover 20 and the skirt portion 31 of the front cover 13 will be called an engaging portion 30. The engaging portion 30 stops the cover 20 from being rotated up and opened relative to the main casing 10. That is, when the cover 20 is urged to rotate from a closed position of the opening 12 toward an open position, the skirt portion 31 contacts and obstructs the bending portion 32. Thus, the cover 20 is prevented from rotating. On the other hand, in order to allow the cover 20 to rotate from the closed position to the open position, the hinge 40 can slide backward. When the hinge 40 slides backward, the bending portion 32 moves backward and disengages from the skirt portion 31, thereby allowing the cover 20 to rotate to the open position.

The hinge 40 comprises a hinge shaft 41 protruding from a side of the cover 20. Moreover, the hinge includes a slotted hole 42 formed in the main casing 10 corresponding to the hinge shaft 41 and accommodating the hinge shaft 41 therein. Here, the hinge shaft 41 can slide backward along the slotted hole 42 when the cover 20 is pressed backward. That is, when the cover 20 is pressed backward from the closed position kept by the engaging portion 30, the hinge shaft 41 is pushed backward along the slotted hole 42. Here, the movable distance of the hinge shaft 41 relative to the slotted hole 42 is preferably at least equal to a distance for allowing the bending portion 32 to get out of the skirt portion 31.

Figure 4:
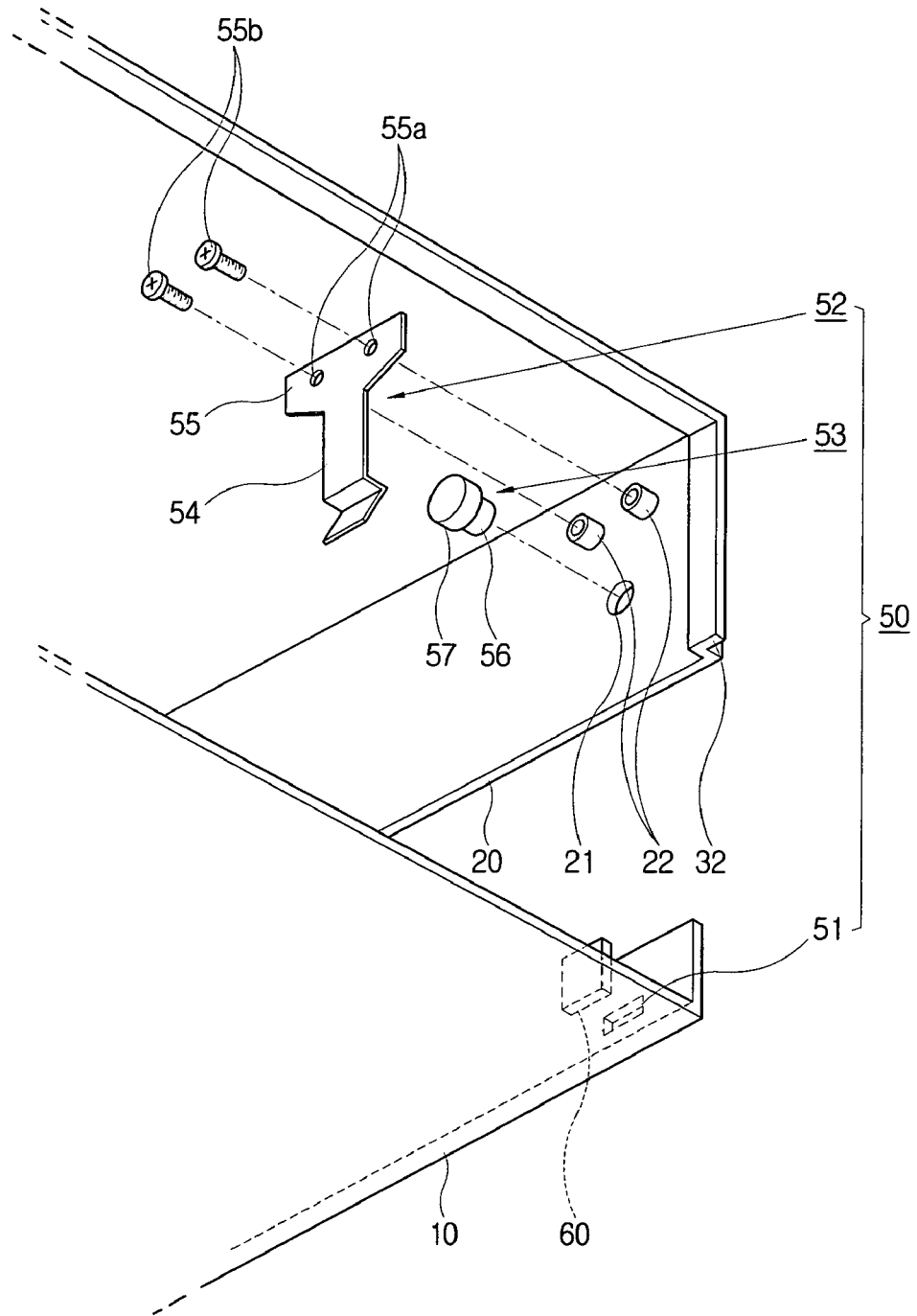
FIG. 4 is an exploded perspective view showing a locking unit of the computer in accordance with an embodiment of the present invention.

Meanwhile, as shown in FIG. 4, a locking unit 50 is additionally provided between the main casing 10 and the cover 20. The locking unit 50 allows the cover 20 to elastically lock to or release from the main casing 10.

The locking unit 50 comprises a locking portion 51 formed on a front region of the main casing 10, and a latch 52 elastically locked to or released from the locking portion 51. Preferably, the locking unit 50 comprises a button 53 contacting and operating the latch 52.

Further, on an inner bottom of the main casing 10 is formed a stopper 60 restricting a movable range of the latch 52.

The latch 52 is provided in the cover 20 and comprises a hook portion 54 that is elastically released from or locked to the locking portion 51 in correspondence to whether the button 53 is pushed or not. An extended portion 55 extends from the hook portion 54 and is coupled to the cover 20. Here, a fastener 55b, such as a screw, is inserted into a coupling boss 22 of the main casing 10 through a fastener hole 55a formed in the extended portion 55 of the latch 52. However, of course, any suitable conventional fastener may be used to fasten latch 52 to the main casing 10. Thus, the latch 52 is fastened to the main casing 10. The hook portion 54 of the latch 52 is movable between a locked position and a released position. When in the locked position, the cover 20 is in the closed position and the hook portion 54 is locked to the locking portion 51. In the released position, the hook portion 54 is released from the locking portion 51.

The button 53 is inserted into a button through hole 21 formed on a side of the cover 20. Further, the button 53 comprises a pushing portion 56 exposed to the outside through the button through hole 21 so as to be pushed by a user, and a contacting portion 57 extends from the pushing portion 56 for contacting the latch 52. Here, the contacting portion 57 has a diameter larger than that of the button through hole 21, so that the button 53 is prevented from falling through the through hole 21.

A process of rotating the cover 20 and opening the opening 12 of the main casing 10 will now be described with reference to FIGS. 5A through 7.

Figure 5A:
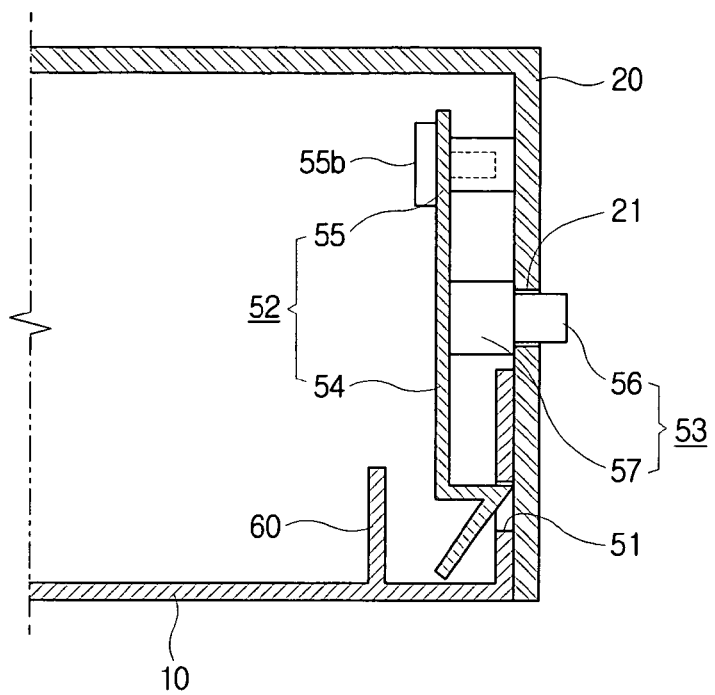
FIGS. 5A and 5B each are a sectional view and a side view showing that a latch is locked to a locking portion in the computer in accordance with an embodiment of the present invention.
Figure 5B:
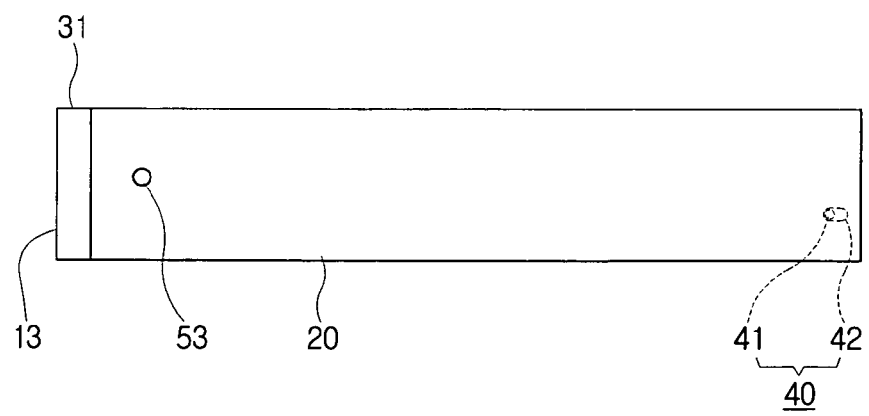

Referring to the computer 1 of FIGS. 5A and 5B, the opening 12 of the main casing 10 is covered with the cover 20, that is, the cover 20 is in the closed position. At this time, the cover 20 cannot be rotated up and opened because the hook portion 54 of the latch 52 is being locked to the locking portion 51. Further, the skirt portion 31 and the bending portion 32 of the engaging portion 30 are engaged to each other, thereby preventing the cover 20 from being rotated up and opened. Furthermore, the pushing portion 56 of the button 53 is exposed to the outside through the button through hole 21, and the contacting portion 57 of the button 53 is in contact with the hook portion 54 of the latch 52.

Figure 6A:
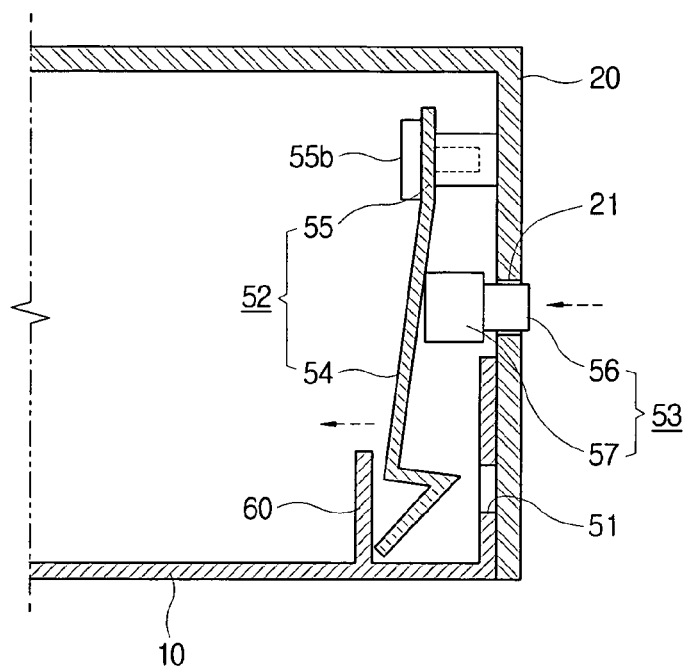
FIGS. 6A and 6B each are a sectional view and a side view showing that the latch is released from the locking portion in the computer in accordance with an embodiment of the present invention.

Referring to FIG. 6A, in order to open the opening 12, a user pushes the pushing portion 56 of the button 53 exposed to the outside of the cover 20. Consequently, the button 53 moves to the inside of the cover 20 through the button through hole 21, so that the contacting portion 57 of the button 53 contacts and pushes the hook portion 54 in a moving direction of the button 53. Thus, the hook portion 54 is released from the locking portion 51. At this time, the movable range of the hook portion 54 is restricted by the stopper 60 formed on the inner bottom of the main casing 10.

Figure 6B:
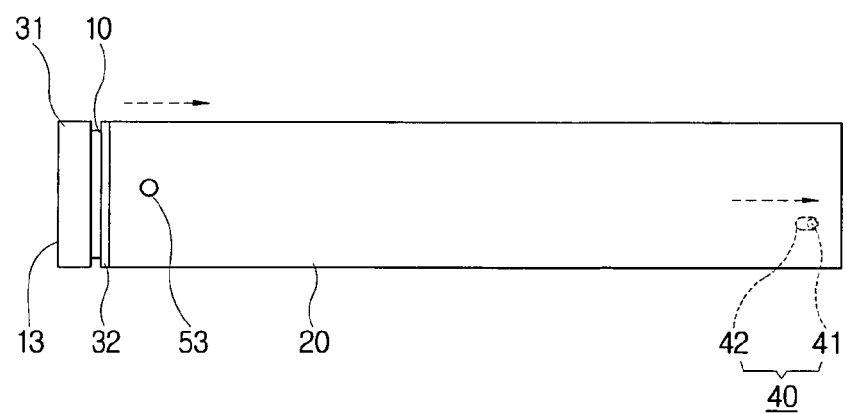

In this state, it is still impossible to rotate and open the cover 20 relative to the main casing 10 because the bending portion 32 is engaged with the inside of the skirt portion 31 (refer to FIG. 3). Therefore, while the button 53 is pushed to release the hook portion 54 from the locking portion 51, a user slides the cover 20 backward as shown in FIG. 6B. Then, the hinge shaft 41 slides backward along the slotted hole 42, so that the bending portion 32 is released from the skirt portion 31, thereby allowing the cover 20 to rotate. Further, in the state that the hook portion 54 is released from the locking portion 51, when the button 53 is released from pushing, the hook portion 54 is elastically returned to an original state with respect to the extended portion 55 fastened to the cover 20.

Figure 7:
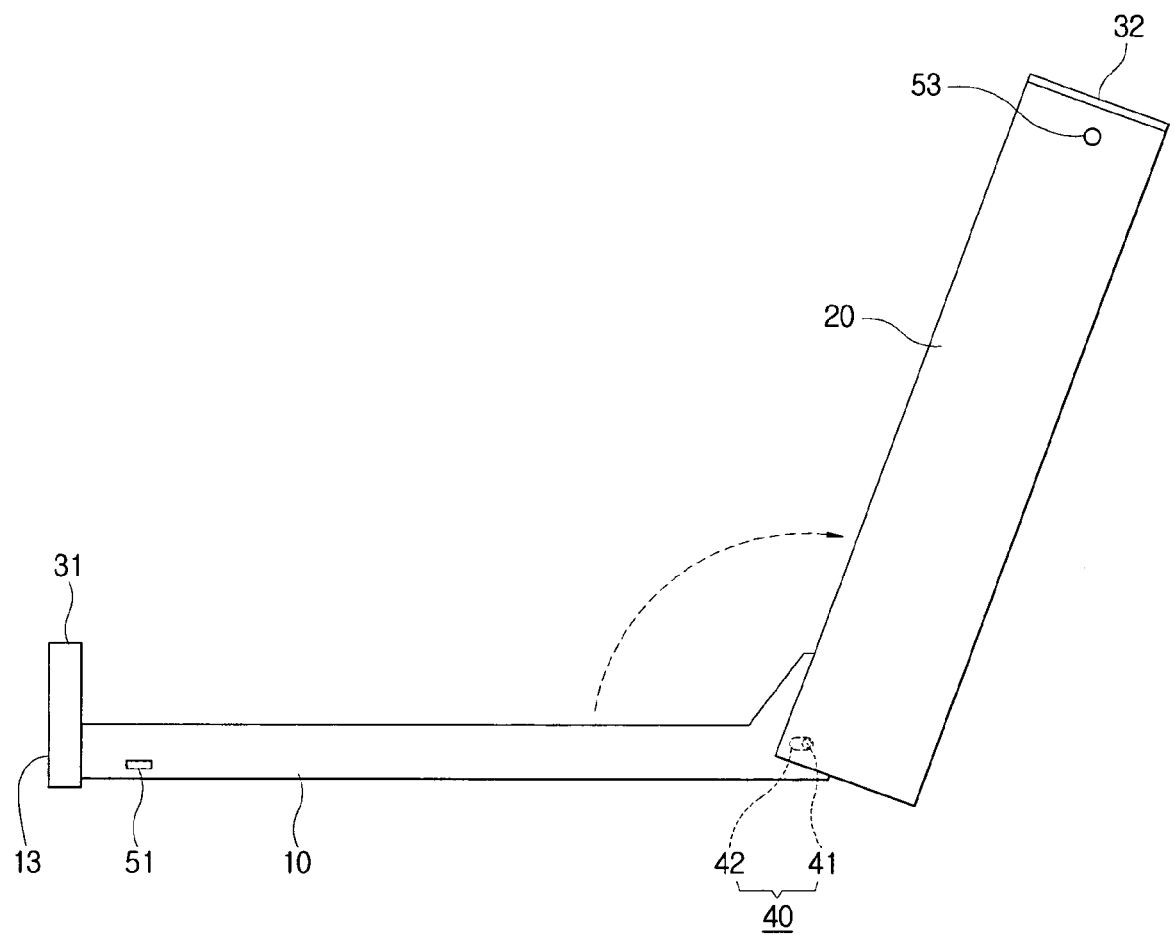
FIG. 7 is a side view showing that the cover is opened up from the main casing and opens an opening of the main casing in the computer in accordance with an embodiment of the present invention.

In the state that the cover 20 is released from the main casing 10, a user can rotate the cover 20 from the closed position to the open position with respect to the hinge 40 (refer to FIG. 7). Thus, to replace or repair the hardware component, a user can easily release the cover 20 from the main casing 10 and open the opening 12 of the main casing 10.

On the other hand, a process of closing the opening 12 of the main casing is performed in a reverse order as follows.

In the state that the cover 20 is opened relative to the opening 12 of the main casing 10, the cover 20 is rotated downward with respect to the hinge 40. At this time, the hinge shaft 41 of the hinge 40 is positioned at a back end of the slotted hole 42. Thus, the front cover 13 of the main casing is distant from the cover 20 at a predetermined distance. To couple the front cover 13 with the cover 20, the cover 20 is moved forward, so that the hook portion 54 of the latch 52 slides along the side of the main casing 10 and is locked to the locking portion 51. Further, the bending portion 32 is engaged with the skirt portion 31.

In the foregoing embodiment, the hinge shaft 41 protrudes from the cover 20, and the slotted hole 42 is formed in the main casing 10. However, the hinge shaft may be provided in the main casing, and the slotted hole may be provided in the cover.

In the foregoing embodiment, the hinge 40 is provided in the back region of the main casing and the cover, but not limited to.

As described above, the present invention provides a computer, in which an opening of a main casing is conveniently opened, so that a user can easily replace and repair hardware components accommodated in the main casing.

While the invention has been shown and described with reference to certain embodiments thereof, it will be understood by those skilled in the art that various changes in form and details may be made without departing from the spirit and scope of the invention as defined by the appended claims.

What is claimed is:

1. A computer comprising:
    a main casing formed with an opening through which a plurality of hardware components are accommodated therein;
    a cover connected to the main casing, the cover adapted to open and close the opening;
    a hinge connecting the cover with the main casing, thereby allowing the cover to rotatably open and close the opening of the main casing, the hinge comprising a hinge shaft provided in one of the main casing and the cover and a slotted hole provided in the other one thereof to accommodate the hinge shaft therein to allow the cover to slide with respect to the main casing; and
    an engaging portion provided in an engaging region between the main casing and the cover, the engaging portion preventing the cover from rotating relative to the main casing, and
    the hinge being slidably configured to allow the cover to disengage from the engaging portion and rotate relative to the main casing.

2. The computer according to claim 1, further comprising a locking unit provided between the main casing and the cover to allow the cover to elastically lock to or release from the main casing.

3. The computer according to claim 2, wherein the locking unit comprises a locking portion formed in one of the main casing and the cover, and a latch provided in the other one thereof to elastically lock to or release from the locking portion.

4. The computer according to claim 3, wherein the locking unit comprises a button contact to operate the latch.

5. The computer according to claim 4, wherein the button and the latch are provided on the cover, and the locking unit is formed on the main casing in correspondence with the latch.

6. The computer according to claim 5, wherein the main casing is provided with a stopper to restrict a movable range of the latch when the latch is released from the locking unit.

7. The computer according to claim 5, wherein the latch comprises a hook portion being released from or locked to the locking portion according to whether the button is pushed or not, and an extended portion extending from the hook portion and coupled to the main casing.

8. The computer according to claim 1, wherein the main casing comprises a front cover forming an outer surface in a front thereof, and the engaging portion comprises a skirt portion bent backward from the front cover and a bending portion formed at a free end of the cover which is engaged with an inside of the skirt portion.

9. The computer according to claim 8, wherein the slotted hole is configured to allow the bending portion to get out of the skirt portion.

10. A method of opening a computer assembly comprising the steps of:
    providing a main casing;
    connecting a cover to the main casing;
    providing an engaging portion in an engaging region between the main casing and the cover to prevent the cover from rotating relative to the main casing;
    arranging a hinge between the main casing and the cover, the hinge comprising a hinge shaft provided in one of the main casing and the cover and a slotted hole provided in the other one thereof to accommodate the hinge shaft therein to allow the cover to slide with respect to the main casing; and sliding the hinge to allow the cover to disengage from the engaging portion and rotate relative to the main casing.

11. The method according to claim 10, further comprising the step of positioning a locking unit between the main casing and the cover to allow the cover to elastically lock to or release from the main casing.

12. The method according to claim 11, wherein the locking unit comprises a locking portion formed in one of the main casing and the cover, and a latch provided in the other one thereof to elastically lock to or release from the locking portion.

13. The method according to claim 12, wherein the locking unit further comprises a button contact to operate the latch.

14. The method according to claim 13, wherein the button and the latch are provided on the cover, and the locking unit is formed on the main casing in correspondence with the latch.

15. The method according to claim 14, wherein the main casing is provided with a stopper to restrict a movable range of the latch when the latch is released from the locking unit.

16. The method according to claim 14, wherein the latch comprises a hook portion being released from or locked to the locking portion according to whether the button is pushed or not, and an extended portion extending from the hook portion and coupled to the main casing.

* * * * *